United States Patent [19]

Mexicotte

[11] Patent Number: 4,610,324
[45] Date of Patent: Sep. 9, 1986

[54] COURIER CLIPBOARD AND SCALE CASE

[76] Inventor: Joseph Mexicotte, 1224 Electric Ave., Apt. 120, Lincoln Park, Mich. 48146

[21] Appl. No.: 752,035

[22] Filed: Jul. 5, 1985

[51] Int. Cl.[4] ...................... G01G 19/00; G01G 21/28
[52] U.S. Cl. ..................................... 177/245; 177/127
[58] Field of Search ............................... 177/127, 245

[56] References Cited

U.S. PATENT DOCUMENTS 783,329 2/1905 Sweet ................................. 177/127
3,565,197 2/1971 Carter ............................. 177/245 X Primary Examiner—George H. Miller, Jr.
Attorney, Agent, or Firm—Cullen, Sloman, Cantor, Grauer, Scott & Rutherford

[57] ABSTRACT

A courier clipboard and scale case includes a hollow box with a scale mounted and enclosed therein with a cover hinged to the box and mounting at one end a spring clip defining with the cover a clipboard.

5 Claims, 3 Drawing Figures

COURIER CLIPBOARD AND SCALE CASE

FIELD OF INVENTION

The present invention relates to a clipboard as used by couriers including a scale case for which the clipboard is the cover.

BACKGROUND OF THE INVENTION

Most couriers use a clipboard for the mounting and attaching of orders, invoices and other charge sheets and wherein the weight of the package being carried or transported must be reasonably estimated by the courier, a charge being made on the spot and payment collected. Since often times courier charge is dependent upon the weight of the package in ounces and/or pounds it is often difficult to accurately estimate what the charge will be for a particular delivery.

SUMMARY OF THE INVENTION

An important feature of the present invention is to provide an improved courier clipboard and wherein the clipboard forms the cover for a scale case enclosing and mounting a scale for the weighing of packages to be transported.

Another feature is to provide a scale case in the form of a hollow elongated box having bottom, side, front and rear walls and wherein a scale having a base is nested within the box and mounted upon the bottom wall and which includes a yieldable top plate and wherein a cover at one end is hinged to the rear wall of the box and overlies and encloses the scale and a spring biased yieldable clip assembly is mounted upon the cover adjacent one end for defining with said cover a clipboard.

Another feature is to provide a clipboard and scale case molded of a plastic material and wherein the cover for the case and its connection thereto provides a lifetime hinge as an integral part thereof.

Another feature includes in conjunction with the scale of an electronic digital readout assembly in connection with the scale for providing a direct reading in ounces or pounds or in metric equivalents including kilos.

These and other features and objects will be seen from the following specification and claims in conjunction with the appended drawing.

THE DRAWING

Figure 1:
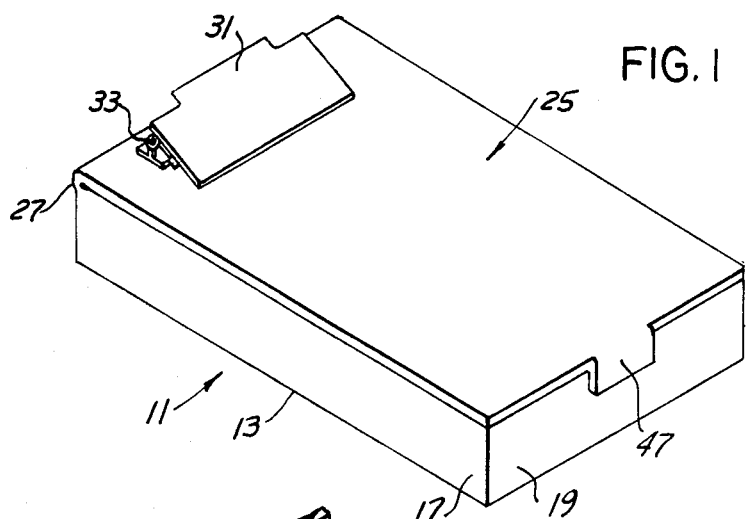
FIG. 1 is a front perspective view of the present courier clipboard and scale case.
Figure 2:
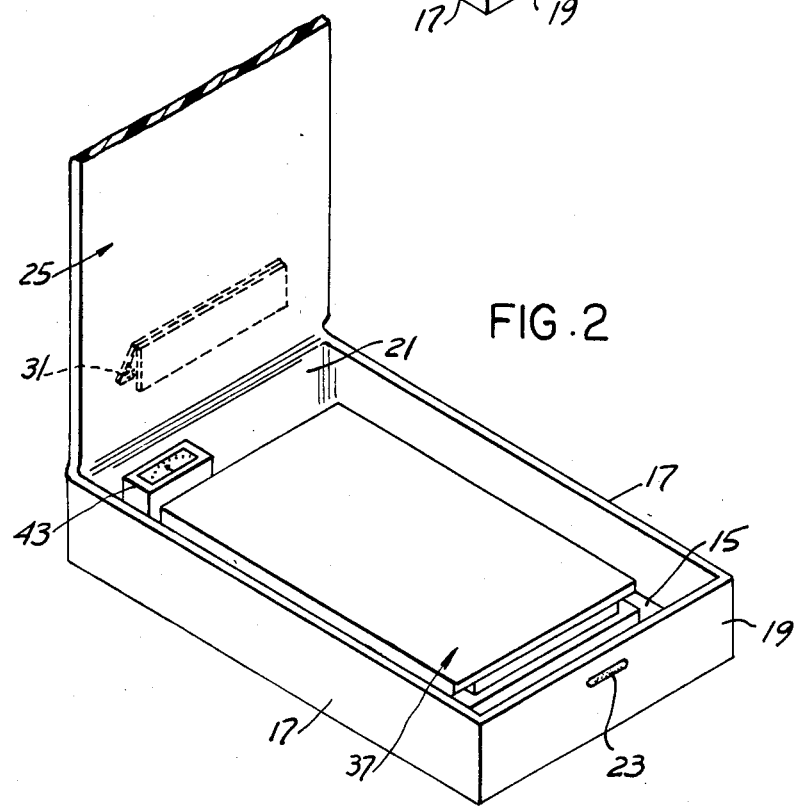
FIG. 2 is a similar view with the cover clipboard fragmentarily shown and in an open position.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

The present courier clipboard and scale case is generally indicated at 11 and includes a box 13 having bottom wall 15, side walls 17, front wall 19 and rear wall 21.

In the illustrative embodiment the present courier clipboard and scale case is formed of a plastic material, and may be in one piece. The hinge connection 27 for the cover 25 is a lifetime type of hinge and wherein one end of the cover 25 is formed as a continuous part of rear wall 21.

Formed upon front wall 19 or molded therein is a detent 23 or projection adapted for retaining frictional registry with the cover tab 47 depending from one end of cover 25.

While cover 25 may be separately hinged as at 27 to box 13 to the rear wall 21 thereof, in the preferred embodiment the hinge 27 is a lifetime continuous hinge along the rear of the cover 25 molded as a part of the top edge of the rear wall 21 of box 13.

Figure 3:
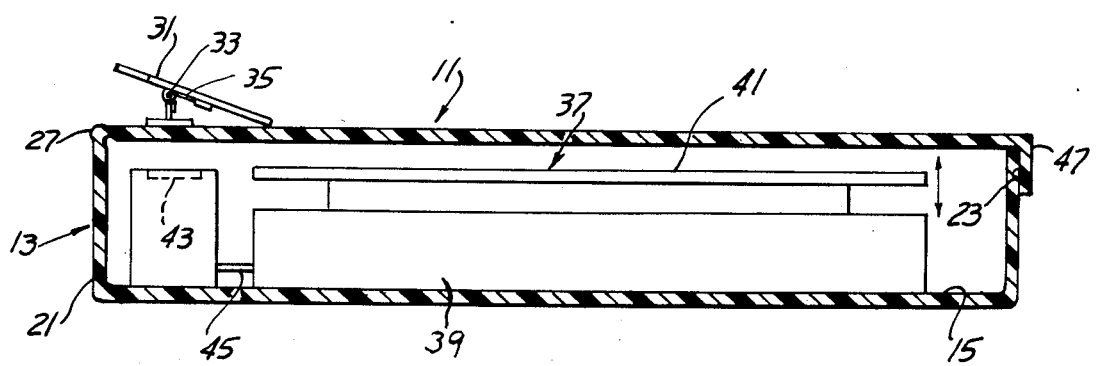
FIG. 3 is a longitudinal section of the courier clipboard and scale case shown in FIG. 1, on an increased scale.

A suitable spring clip 31 of a conventional construction having a pivot mounting 33 and a biasing spring 35 is mounted upon cover 25 adjacent hinge 27, FIG. 3. The spring clip 31 is normally biased downwardly to the forwardly inclined position shown in FIG. 3 adapted for retaining one or a sheaf of papers, invoices, orders or the like.

A suitable scale 37, such as may be purchased on the market, includes a base 39, FIG. 3, which is positioned and secured upon bottom wall 15 and is normally enclosed between the side walls of the box and cover.

Yieldable top plate 41 of the scale overlies the scale base 39, is furthur contained within box 13 and is spaced below cover 25 to provide some storage space as desired.

Connected with scale base 39 is a suitable electronic digital readout 43 which may be calibrated in ounces and pounds or alternately or equivalently in kilos or other metric units for convenient reading by the courier for the weighing of a parcel or package to be shipped. This permits a prompt determination of the charges therefor without estimating. The electronic digital readout assembly 43 is connected to the scale base as by the connector 45 in FIG. 3.

Having described my invention reference should now be had to the following claims.

I claim:

1. A courier clipboard and scale case comprising a hollow elongated box having bottom, side, front and rear walls;
    a scale having a base nested and mounted within said box upon said bottom wall, including a yieldable top plate;
    a cover at one end hinged to said rear wall normally overlying and enclosing said scale;
    and a spring biased yieldable clip assembly mounted upon said cover adjacent one end and defining with said cover a clipboard.

2. In the courier clipboard and scale case of claim 1, said yieldable clip being mounted adjacent the hinged end of said cover.

3. In the courier clipboard of claim 1, a detent formed in said front wall; and
    a cover tab depending from said cover at one end frictionally registrable with said detent.

4. In the courier clipboard of claim 1, an electronic digital read-out upon said bottom wall adjacent to and connected with said scale.

5. In the courier clipboard of claim 1, said courier case, box and cover being molded from a plastic material and with said cover at one end molded to and connected to said rear wall as a part thereof providing a lifetime hinge connection for said cover.

* * * * *